(12) United States Patent
Wen et al.

(10) Patent No.: US 10,719,124 B2
(45) Date of Patent: Jul. 21, 2020

(54) TRACKING SYSTEM, TRACKING METHOD FOR REAL-TIME RENDERING AN IMAGE AND NON-TRANSITORY COMPUTER-READABLE MEDIUM

(71) Applicant: HTC Corporation, Taoyuan (TW)

(72) Inventors: Yu-You Wen, Taoyuan (TW); Jiun-Lin Chen, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 16/264,686

(22) Filed: Feb. 1, 2019

(65) Prior Publication Data

US 2019/0243444 A1 Aug. 8, 2019

Related U.S. Application Data

(60) Provisional application No. 62/627,683, filed on Feb. 7, 2018.

(51) Int. Cl.
*G06F 3/01* (2006.01)
*G06T 19/00* (2011.01)
*G06F 3/0346* (2013.01)

(52) U.S. Cl.
CPC ............ *G06F 3/011* (2013.01); *G06F 3/0346* (2013.01); *G06T 19/00* (2013.01)

(58) Field of Classification Search
CPC .......... G06F 3/011; G06F 3/012; G06F 3/013; G06F 3/014; G06F 3/03; G06F 3/0304; G06F 3/0346; G06F 3/0354; G06T 19/00; G06T 19/003; G06T 19/006; G06T 19/20; G02B 2027/01; G02B 2027/0101
See application file for complete search history.

(56) References Cited

U.S. PATENT DOCUMENTS

| | | | | |
|---|---|---|---|---|
| 2007/0003915 A1* | 1/2007 | Templeman | ............ | G06F 3/011 434/247 |
| 2011/0285704 A1* | 11/2011 | Takeda | ..................... | G06F 3/011 345/419 |
| 2013/0257724 A1* | 10/2013 | Fein | ..................... | G02B 27/0093 345/158 |
| 2014/0145966 A1* | 5/2014 | Gardenfors | ............. | G06F 3/012 345/173 |
| 2015/0188984 A1* | 7/2015 | Mullins | .................... | H04L 67/04 709/219 |

(Continued)

*Primary Examiner* — Tom V Sheng
(74) *Attorney, Agent, or Firm* — CKC & Partners Co., LLC

(57) ABSTRACT

A tracking system, tracking method for real-time rendering an image and non-transitory computer-readable medium are provided in this disclosure. The tracking system includes a controller, a server and an electronic device. The electronic device includes a processor and a displayer. The controller is configured for providing a first tracking data and a second tracking data. The electronic device is configured for providing a first viewing data and a second viewing data. The server is configured for generating a first image according to the first tracking data and the first viewing data received from the electronic device. The processor is configured for receiving the first image and generating a second image according to the first image, the second tracking data and the second viewing data. The displayer is configured for displaying a simulated scenario according to the second image.

15 Claims, 7 Drawing Sheets

(56) References Cited

U.S. PATENT DOCUMENTS

| | | | |
|---|---|---|---|
| 2015/0348327 A1* | 12/2015 | Zalewski | G06F 3/01 |
| | | | 345/419 |
| 2016/0054798 A1* | 2/2016 | Messingher | G06T 19/006 |
| | | | 345/156 |
| 2016/0154241 A1* | 6/2016 | Alhashim | G02B 27/0172 |
| | | | 345/8 |
| 2016/0321917 A1* | 11/2016 | Qiu | G01S 5/18 |
| 2017/0031503 A1* | 2/2017 | Rosenberg | G06F 3/045 |
| 2017/0087455 A1* | 3/2017 | Black | A63F 13/428 |
| 2017/0329503 A1* | 11/2017 | Tilton | G06F 3/017 |
| 2017/0372524 A1* | 12/2017 | Hill | A63F 13/04 |
| 2018/0314322 A1* | 11/2018 | Tseng | G06F 3/011 |
| 2019/0033960 A1* | 1/2019 | Ho | A63F 13/52 |
| 2019/0073830 A1* | 3/2019 | Fujimoto | G06F 3/014 |
| 2019/0113966 A1* | 4/2019 | Connellan | G01S 5/0294 |
| 2019/0122440 A1* | 4/2019 | Barros | G06T 7/75 |
| 2019/0146598 A1* | 5/2019 | Peri | G06F 3/012 |
| | | | 345/158 |
| 2019/0155372 A1* | 5/2019 | Cuervo | H04B 10/11 |
| 2019/0243472 A1* | 8/2019 | Stafford | A63F 13/25 |
| 2019/0369404 A1* | 12/2019 | Joshi | G06F 3/011 |
| 2020/0009456 A1* | 1/2020 | Takeda | A63F 13/26 |

* cited by examiner

100

TRACKING SYSTEM, TRACKING METHOD FOR REAL-TIME RENDERING AN IMAGE AND NON-TRANSITORY COMPUTER-READABLE MEDIUM

CROSS-REFERENCE TO RELATED APPLICATION

This application claims priority to U.S. Provisional Application Ser. No. 62/627,683, filed on Feb. 7, 2018, which is herein incorporated by reference.

BACKGROUND

Field of Invention

The present application relates to a system and method for real-time rendering an image and non-transitory computer-readable medium. More particularly, the present application relates to a tracking system and tracking method for re-projecting an image with the latest tracking data and non-transitory computer-readable medium.

Description of Related Art

In the augmented reality (AR) system or the virtual reality (VR) system, it needs to account for the user movement in real time to provide a more realistic VR or AR experience. When the user moves their controllers, the images on which the head mounted device (HMD) displays need to be updated. However, if the handheld controller and the head mounted device is moving, the system needs to re-render the new images based on new motion of user, there may occur a delay for displaying the new images on the head mounted device. Therefore, a tracking system for decreasing delay of rendering images based on the latest tracking data and the latest viewing data in the virtual reality or the augmented reality system is required.

SUMMARY

An aspect of the disclosure is to provide a tracking system for real-time rendering an image. The tracking system includes a controller, a server and an electronic device. The controller is configured for providing a first tracking data and a second tracking data, wherein the first tracking data and the second tracking data are corresponding to different timings. The server is communicatively connected with the controller, and is configured for receiving the first tracking data. The electronic device is communicatively connected with the controller and the server, and is configured for providing a first viewing data and a second viewing data, wherein the first viewing data and the second viewing data are corresponding to different timings. The electronic device includes a processor and a displayer. The processor is configured for receiving the second tracking data. The displayer is electrically connected to the processor, wherein the server is configured for generating a first image according to the first tracking data and the first viewing data received from the electronic device; the processor is configured for receiving the first image and generating a second image according to the first image, the second tracking data and the second viewing data; the displayer is configured for displaying a simulated scenario according to the second image.

Another aspect of the disclosure is to provide a tracking method for real-time rendering an image. The tracking method includes operations of: generating a first image according to a first tracking data received from a controller and a first viewing data received from an electronic device by the server; receiving the first image and generating a second image according to the first image, the second tracking data and the second viewing data by the electronic device; and displaying a simulated scenario according to the second image by a displayer, wherein the first tracking data and the second tracking data are provided by the controller and correspond to different timings; the first viewing data and the second viewing data are provided by the electronic device and correspond to different timings.

Another aspect of the disclosure is to provide a non-transitory computer-readable medium including one or more sequences of instructions to be executed by a processor of an electronic device for performing a tracking method for real-time rendering an image, wherein the method includes operations of: generating a first image according to the first tracking data received from the controller and receiving the first image and generating a second image according to the first image, the second tracking data and the second viewing data by the electronic device; and displaying a simulated scenario according to the second image by a displayer, wherein the first tracking data and the second tracking data are provided by the controller and correspond to different timings; the first viewing data and the second viewing data are provided by the electronic device and correspond to different timings.

It is to be understood that both the foregoing general description and the following detailed description are by examples, and are intended to provide further explanation of the disclosure as claimed.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

It will be understood that, in the description herein and throughout the claims that follow, when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Moreover, "electrically connect" or "connect" can further refer to the interoperation or interaction between two or more elements.

It will be understood that, in the description herein and throughout the claims that follow, although the terms "first," "second," etc. may be used to describe various elements, these elements should not be limited by these terms. These terms are only used to distinguish one element from another. For example, a first element could be termed a second element, and, similarly, a second element could be termed a first element, without departing from the scope of the embodiments.

It will be understood that, in the description herein and throughout the claims that follow, the terms "comprise" or "comprising," "include" or "including," "have" or "having," "contain" or "containing" and the like used herein are to be understood to be open-ended, i.e., to mean including but not limited to.

It will be understood that, in the description herein and throughout the claims that follow, the phrase "and/or" includes any and all combinations of one or more of the associated listed items.

It will be understood that, in the description herein and throughout the claims that follow, words indicating direction used in the description of the following embodiments, such as "above," "below," "left," "right," "front" and "back," are directions as they relate to the accompanying drawings. Therefore, such words indicating direction are used for illustration and do not limit the present disclosure.

It will be understood that, in the description herein and throughout the claims that follow, unless otherwise defined, all terms (including technical and scientific terms) have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any element in a claim that does not explicitly state "means for" performing a specified function, or "step for" performing a specific function, is not to be interpreted as a "means" or "step" clause as specified in 35 U.S.C. § 112(f). In particular, the use of "step of" in the claims herein is not intended to invoke the provisions of 35 U.S.C. § 112(f).

Figure 1:
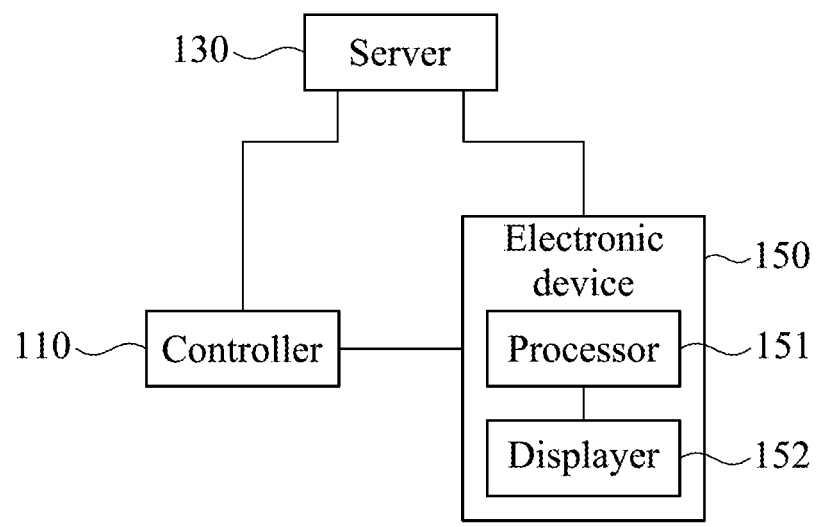
FIG. 1 is a functional block diagram illustrating a tracking system according to an embodiment of the disclosure.

Reference is made to FIG. 1, which is a functional block diagram illustrating a tracking system 100 according to an embodiment of the disclosure. As shown in FIG. 1, the tracking system 100 includes a controller 110, a server 130 and an electronic device 150. The server 130 is communicatively connected with the controller 110 and the electronic device 150. The electronic device 150 includes a processor 151 and a displayer 152. The processor 151 is electrically connected to the displayer 152. In some embodiment, the server 130 can be integrated within the electronic device 150. In some embodiment, the electronic device 150 can be a head-mounted display (HMD). The server 130 can be implemented by a cloud server. The processor 151 can be implemented by a central processing unit, a control circuit and/or a graphics processing unit. When a user wears the electronic device 150, the displayer 152 will cover visions of the user, and the displayer 152 is configured for displaying a virtual reality scene or an augmented reality scene to the user.

Figure 2:
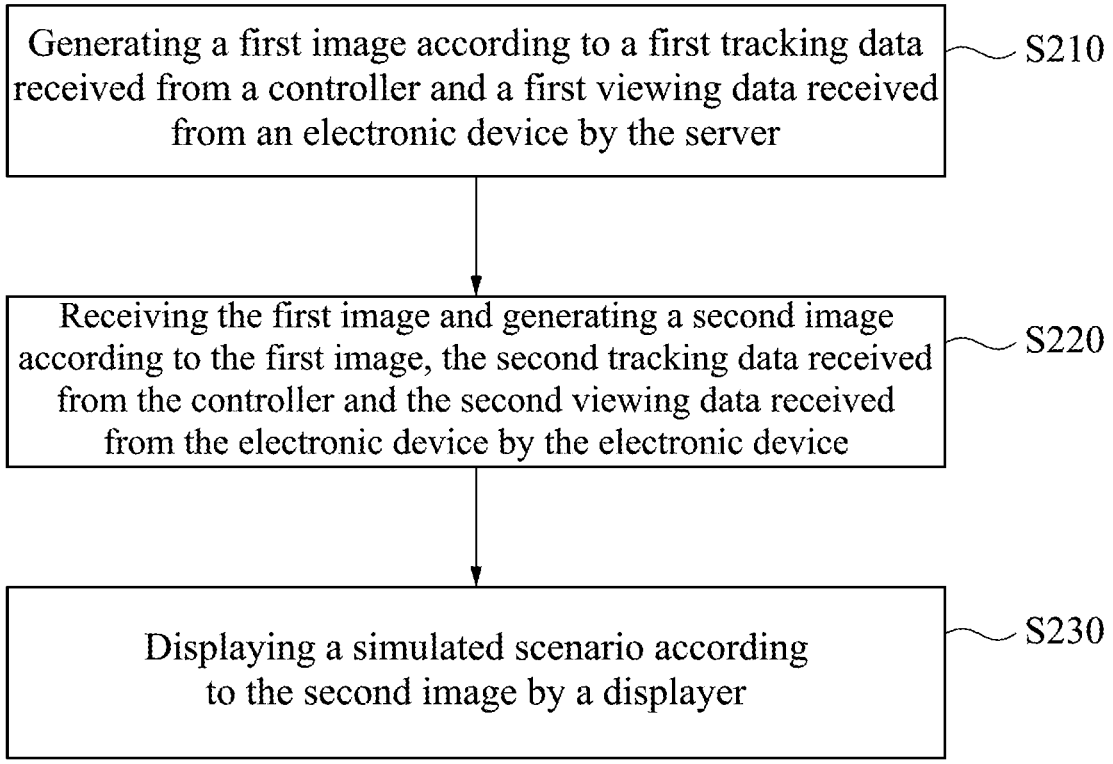
FIG. 2 is a flow diagram illustrating a tracking method according to an embodiment of this disclosure.

Reference is made to FIG. 2, which is a flow diagram illustrating a method 200 according to an embodiment of this disclosure. In the embodiment, the tracking method 200 for real-time rendering an image can be utilized to perform computations for warping an image from a first perspective (e.g., based on a first position of the controller) to a second perspective (e.g., based on a second position of the controller) without re-rendering the image from the second perspective by the server 130.

Figure 3:
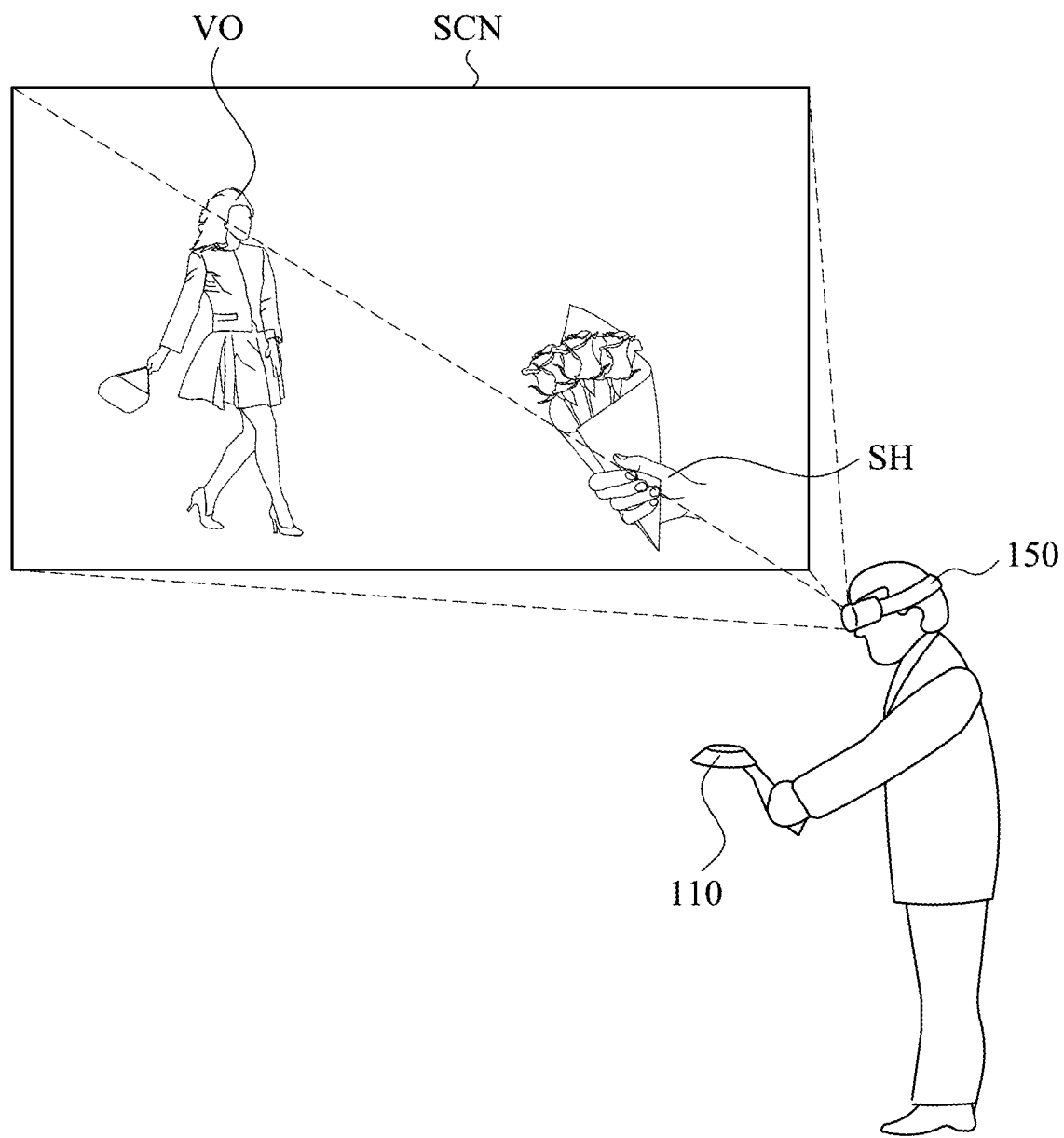
FIG. 3 is a schematic diagram illustrating a user interacts with the augmented reality system by the controller and the electronic device according to an embodiment of this disclosure.

Reference is made to FIG. 1 and FIG. 2. As the embodiment shown in FIG. 2, the tracking method 200 firstly executes step S210 to generate a first image according to a first tracking data received from a controller 110 and a first viewing data received from an electronic device 150 by the server 130. Reference is made to FIG. 3, which is a schematic diagram illustrating a user interacts with the augmented reality system by the controller 110 and the electronic device 150 according to an embodiment of this disclosure. In the embodiment, the user wearers the electronic device 150 and manipulates the controller 110. The simulated hand gesture SH of an avatar in a simulated scenario SCN is displayed by the electronic device 150. When the user moves the controller 110, the simulated hand gesture SH of the avatar will move synchronously with the controller 110.

Figure 4:
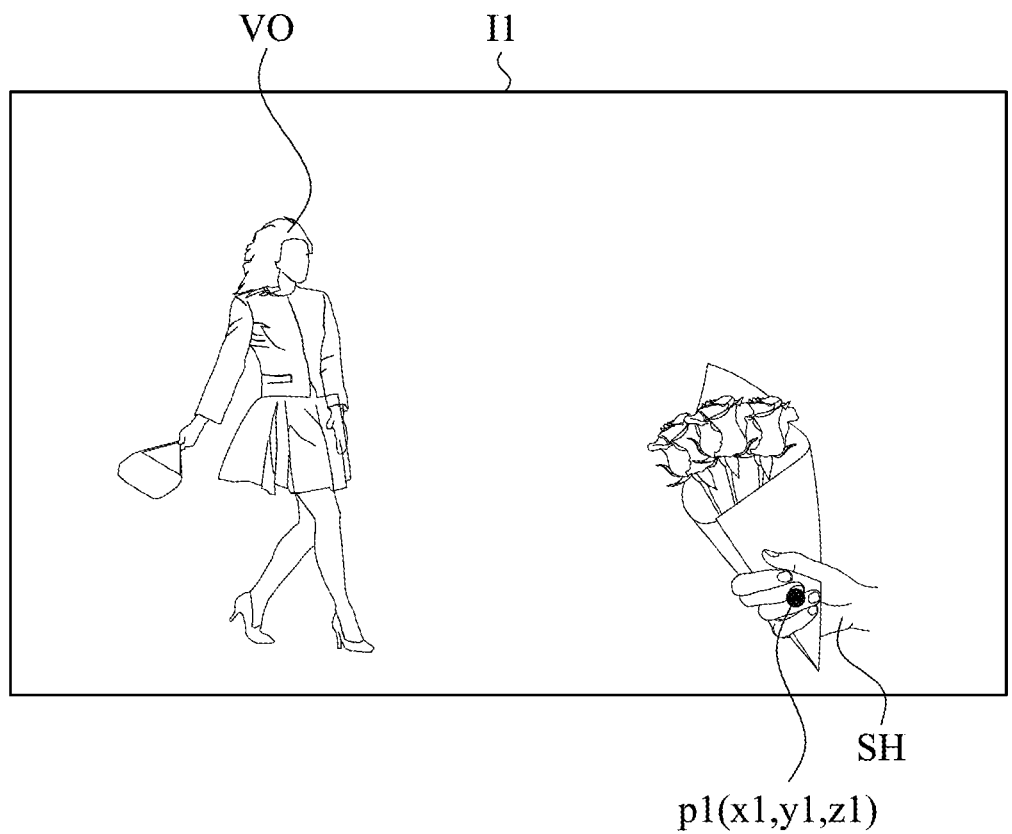
FIG. 4 is a schematic diagram illustrating the simulated hand gesture of the avatar in first image according to an embodiment of this disclosure.

Reference is made to FIG. 4, which is a schematic diagram illustrating the simulated hand gesture SH of the avatar in first image I1 according to an embodiment of this disclosure. In the embodiment, the controller 110 is configured to provide first tracking data and the second tracking data in different timings, and the electronic device 150 is configured to provide first viewing data and the second viewing data in different timings. As shown in FIG. 4, the first tracking data includes the first position of the controller 110 at time t1, and for example, the coordinate of the first position of the controller 110 is p1(x1, y1, z1). The server 130 is configured to generate a first image I1, and content of the first image I1 includes the virtual object VO and the simulated hand gesture SH. Then, the server 130 is configured to render the simulated scenario SCN at time t1 by using the first image I1 and the depth data (the depth data can be implemented by a depth image generated by the depth sensor or multi-view sensor).

Figure 5:
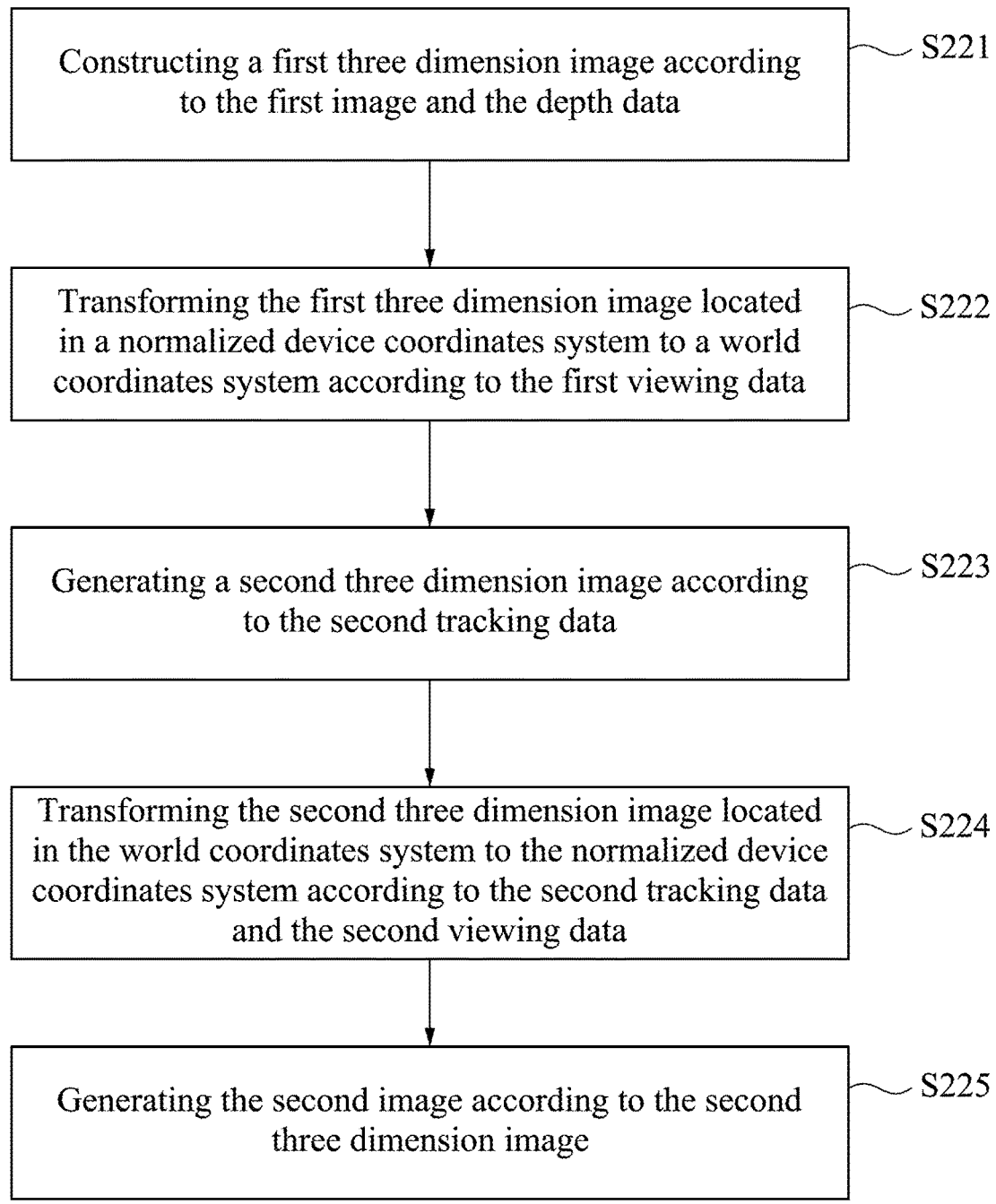
FIG. 5 is a flow diagram illustrating step S220 according to an embodiment of this disclosure.

Afterwards, the tracking method 200 executes step S220 to receive the first image I1 and generate a second image I2 according to the first image I1, the second tracking data received from the controller 110 and the second viewing data received from the electronic device 150 by the electronic device 150. The step S220 further includes steps S221~S225, reference is made to FIG. 5, which is a flow diagram illustrating step S220 according to an embodiment of this disclosure. As the embodiment shown in FIG. 5, the method 200 executes step S221 to construct a first three dimension image according to the first image I1 and the depth data. Based on aforesaid embodiment, the electronic device 150 is configured to construct the first three dimension image corresponding to the first image I1 (as shown in FIG. 4) and the depth data.

In the gaming engine (Open GL, Unity 3D, DirectX, etc.), vertices of model need to transform from the model coordinates system (all vertices defined relatively to the center of the model) to the world coordinates system (all vertices defined relatively to the center of the world) using by the model matrix. Then, vertices of model need to transform from the world coordinates system (all vertices defined relatively to the center of the world) to the camera coordinates system (all vertices defined relatively to the camera) using by the view matrix. Then, vertices of model need to transform from the camera coordinates system to the normalized device coordinates (NDC) system using by the projection matrix. The normalized device coordinates system makes up a coordinate system that describes positions on a virtual device.

Afterwards, the method 200 executes step S222 to transform the first three dimension image located in a normalized device coordinates system to a world coordinates system according to the first viewing data. Based on aforesaid embodiment, the first tracking data includes the first position p1 of the controller 110 at time t1 (as shown in FIG. 4). The first position p1 of the controller 110 can be utilized to generate a model matrix, and the first position p1 of the electronic device 150 can be utilized to generate a viewing matrix. The first three dimension image need to transform from the normalized device coordinates system to the world coordinates system utilizing by the projection matrix and the view matrix.

Figure 6:
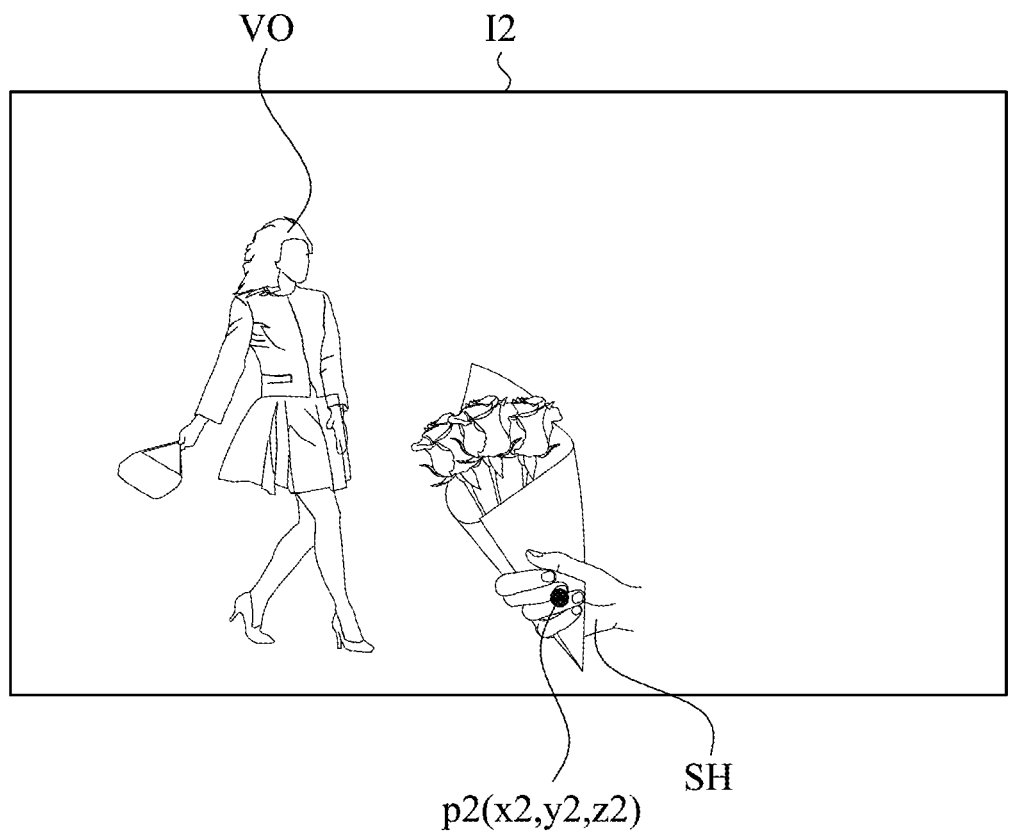
FIG. 6 is a schematic diagram illustrating the simulated hand gesture of the avatar in second image according to an embodiment of this disclosure.

Afterwards, the method 200 executes step S223 to generate a second three dimension image according to the second tracking data. Reference is made to FIG. 6, which is a schematic diagram illustrating the simulated hand gesture SH of the avatar in second image I2 according to an embodiment of this disclosure. As shown in FIG. 6, the second tracking data includes the second position of the controller 110 at time t2, and for example, the coordinate of the second position of the controller 110 is p2(x2, y2, z2). Timing of the second tracking data provided by the controller 110 is later than timing of the first tracking data provided by the controller 110. The simulated hand gesture SH is adjusted by the second position p2 in the second three dimension image. The processor 151 of the electronic device 150 is configured to warp the simulated hand gesture SH from the first position p1 of the controller 110 to the second position p2 of the controller 110.

Then, the processor 151 is configured to generate the second three dimension image at time t2 by using the new simulated hand gesture SH. It is noticed that the second three dimension image located in the world coordinates system includes the depth information, and the depth information is corresponding to the first image I1, but the position of the simulated hand gesture SH is different between the first image I1 and the second image I2. Furthermore, the difference between the first position p1 and the second position p2 will not be too large (depending on the time difference between time t1 and time t2). Thus, the depth information of the simulated hand gesture SH corresponding to the first image I1 is similar with the depth information of the simulated hand gesture SH corresponding to the second image I2.

Afterwards, the method 200 executes step S224 to transform the second three dimension image located in the world coordinates system to the normalized device coordinates system according to the second tracking data and the second viewing data, and the step S225 to generate the second image I2 according to the second three dimension image. In the embodiment, timing of the second viewing data provided by the electronic device 150 is later than timing of the first viewing data provided by the electronic device. The second position of the controller 110 can be utilized to generate a new model matrix, and the second position of the electronic device 150 can be utilized to generate a new viewing matrix. Therefore, the second three dimension image need to transform from the world coordinates system to the normalized device coordinates system utilizing by the new view matrix and the projection matrix.

Afterwards, the method 200 executes step S230 to display a simulated scenario SCN according to the second image I2 by a displayer 152. In the embodiment, the simulated scenario SCN rendered by processor 151 must be projected onto the displayer 152 as a two dimension image. It can be realized that the simulated hand gesture SH corresponding to the second position p2 and the virtual object VO of the simulated scenario SCN is in the normalized device coordinates system and the processor 151 is configured to transmit the second image I2 to the displayer 152. The displayer 152 is configured to display the simulated scenario SCN.

Figure 7:
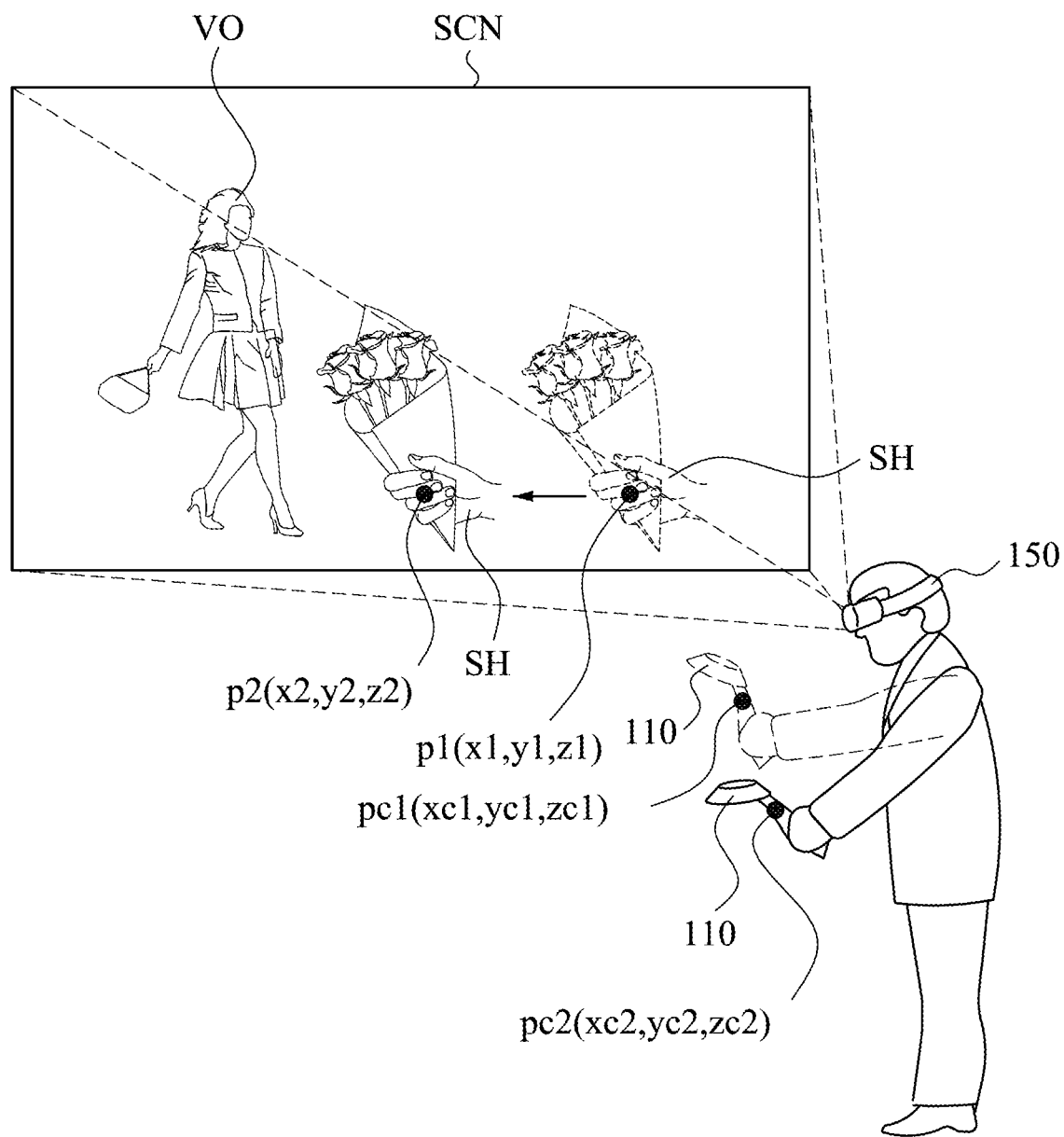
FIG. 7 is a schematic diagram illustrating a user interacts with the augmented reality system by the controller and the electronic device according to an embodiment of this disclosure.

Reference is made to FIG. 7, which is a schematic diagram illustrating a user interacts with the augmented reality system by the controller 110 and the electronic device 150 according to an embodiment of this disclosure. Based on aforesaid embodiment, when the controller 110 locates in the position pc1, the coordinate of the position pc1 of the controller 110 is pc1(xc1, yc1, zc1), and server 130 is configured to render the first image I1 having the simulated hand gesture SH located in the position p1. Then, the first image I1 is transmitted to the electronic device 150, and the processor 151 is configured to re-project the simulated hand gesture SH from the position p1 to the position p2. The processor 151 is configured to re-render the second image I2 according to the new position pc2 of the controller 110, and the coordinate of the position pc2 of the controller 110 is pc2(xc2, yc2, zc2). Therefore, the displayer 152 is configured to display the simulated scenario SCN according to the second image I2.

Another embodiment of the disclosure is a non-transitory computer-readable storage medium. The non-transitory computer readable storage medium stores instructions for performing the method 200 for displaying an augmented reality scene in aforesaid embodiment shown in FIG. 2.

Based on aforesaid embodiments, system, method, and non-transitory computer-readable medium for transforming an image are capable of rendering the first image according to the tracking data received from the controller and the viewing data received from the electronic device; and re-projecting the simulated hand gesture SH according to the new tracking data and the new viewing data. In some embodiments, the head-mounted display is able to display the simulated hand gesture SH in the augmented reality scenario without delay.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:
1. A tracking system for real-time rendering an image, the tracking system comprising:

a controller, configured for providing a first tracking data and a second tracking data, wherein the first tracking data and the second tracking data are corresponding to different timings;

a server, communicatively connected with the controller, configured for receiving the first tracking data; and an electronic device, communicatively connected with the controller and the server, configured for providing a first viewing data and a second viewing data, wherein the first viewing data and the second viewing data are corresponding to different timings, the electronic device comprising:
  a processor, configured for receiving the second tracking data; and
  a displayer, electrically connected to the processor;

wherein the server is configured for generating a first image according to the first tracking data and the first viewing data received from the electronic device; the processor is configured for receiving the first image and generating a second image according to the first image, the second tracking data and the second viewing data; the displayer is configured for displaying a simulated scenario according to the second image, wherein the first tracking data comprises a first position of the controller, and second tracking data comprises a second position of the controller; the first viewing data comprises a first position of the electronic device, and second viewing data comprises a second position of the electronic device.

2. The tracking system of claim 1, wherein the server is configured to transmit the first image, the first viewing data, the first tracking data, and a depth data corresponding to the first image to the electronic device.

3. The tracking system of claim 2, the processor is further configured for executing following steps:
  constructing a first three dimension image according to the first image and the depth data;
  transforming the first three dimension image located in a normalized device coordinates system to a world coordinates system according to the first viewing data;
  generating a second three dimension image according to the second tracking data;
  transforming the second three dimension image located in the world coordinates system to the normalized device coordinates system according to the second tracking data and the second viewing data; and
  generating the second image according to the second three dimension image.

4. The tracking system of claim 1, wherein timing of the second tracking data provided by the controller is later than timing of the first tracking data provided by the controller, and timing of the second viewing data provided by the electronic device is later than timing of the first viewing data provided by the electronic device.

5. The tracking system of claim 1, wherein a model matrix is generated by the first position of the controller and the second position of the controller, and a view matrix is generated by the first position of the electronic device and the second position of the electronic device.

6. A tracking method for real-time rendering an image, comprising:
  generating a first image according to a first tracking data received from a controller and a first viewing data received from an electronic device by a server;
  receiving the first image and generating a second image according to the first image, a second tracking data received from the controller and a second viewing data received from the electronic device by the electronic device; and
  displaying a simulated scenario according to the second image by a displayer, wherein the first tracking data and the second tracking data are provided by the controller and correspond to different timings; the first viewing data and the second viewing data are provided by the electronic device and correspond to different timings, wherein the first tracking data comprises a first position of the controller, and second tracking data comprises a second position of the controller; the first viewing data comprises a first position of the electronic device, and second viewing data comprises a second position of the electronic device.

7. The tracking method of claim 6, wherein the server is configured to transmit the first image, the first viewing data, the first tracking data, and a depth data corresponding to the first image to the electronic device.

8. The tracking method of claim 7, wherein the step of receiving the first image and generating the second image by the electronic device, further comprising:
  constructing a first three dimension image according to the first image and the depth data;
  transforming the first three dimension image located in a normalized device coordinates system to a world coordinates system according to the first viewing data;
  generating a second three dimension image according to the second tracking data;
  transforming the second three dimension image located in the world coordinates system to the normalized device coordinates system according to the second tracking data and the second viewing data; and
  generating the second image according to the second three dimension image.

9. The tracking method of claim 6, wherein timing of the second tracking data provided by the controller is later than timing of the first tracking data provided by the controller, and timing of the second viewing data provided by the electronic device is later than timing of the first viewing data provided by the electronic device.

10. The tracking method of claim 6, wherein a model matrix is generated by the first position of the controller and the second position of the controller, and a view matrix is generated by the first position of the electronic device and the second position of the electronic device.

11. A non-transitory computer-readable medium including one or more sequences of instructions to be executed by a processor of an electronic device for performing a tracking method for real-time rendering an image, wherein the method comprises:
  generating a first image according to a first tracking data received from a controller and a first viewing data received from the electronic device by a server;
  receiving the first image and generating a second image according to the first image, a second tracking data received from the controller and a second viewing data received from the electronic device by the electronic device; and
  displaying a simulated scenario according to the second image by a displayer, wherein the first tracking data and the second tracking data are provided by the controller and correspond to different timings; the first viewing data and the second viewing data are provided by the electronic device and correspond to different timings, wherein the first tracking data comprises a first position of the controller, and second tracking data comprises a second position of the controller; the first viewing data comprises a first position of the electronic device, and second viewing data comprises a second position of the electronic device.

12. The non-transitory computer-readable medium of claim 11, wherein the server is configured to transmit the first image, the first viewing data, the first tracking data, and a depth data corresponding to the first image to the electronic device.

13. The non-transitory computer-readable medium of claim 12, wherein the step of receiving the first image and generating the second image by the processor, further comprising:
   constructing a first three dimension image according to the first image and the depth data;
   transforming the first three dimension image in a normalized device coordinates system to a world coordinates system according to the first viewing data;
   generating a second three dimension image according to the second tracking data;
   transforming the second three dimension image in the world coordinates system to a normalized device coordinates system according to the second tracking data and the second viewing data; and
   generating the second image according to the second three dimension image.

14. The non-transitory computer-readable medium of claim 11, wherein timing of the second tracking data provided by the controller is later than timing of the first tracking data provided by the controller, and timing of the second viewing data provided by the electronic device is later than timing of the first viewing data provided by the electronic device.

15. The non-transitory computer-readable medium of claim 11, wherein a model matrix is generated by the first position of the controller and the second position of the controller, and a view matrix is generated by the first position of the electronic device and the second position of the electronic device.

* * * * *